United States Patent
Chiazor et al.

(10) Patent No.: US 12,438,720 B2
(45) Date of Patent: Oct. 7, 2025

(54) AUTHENTICATING A SYSTEM MAINTENANCE VIA A COGNITIVE AND BLOCKCHAIN-BASED PROCESS

(71) Applicant: International Business Machines Corporation, Armonk, NY (US)

(72) Inventors: Lamogha Chiazor, Eastleigh (GB); Paritosh Ranjan, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 18/304,518

(22) Filed: Apr. 21, 2023

(65) Prior Publication Data

US 2024/0356749 A1    Oct. 24, 2024

(51) Int. Cl.
*H04L 9/32* (2006.01)
*G06F 40/40* (2020.01)
*G06V 20/40* (2022.01)

(52) U.S. Cl.
CPC ............ *H04L 9/32* (2013.01); *G06F 40/40* (2020.01); *G06V 20/44* (2022.01)

(58) Field of Classification Search
CPC ......... H04L 9/32; H04L 63/0823; H04L 9/50; H04L 63/12; G06F 40/40; G06F 40/30; G06V 20/44; G06Q 2220/00; G06Q 10/063; G06Q 10/103; G06Q 30/018; G06Q 10/20
See application file for complete search history.

(56) References Cited

U.S. PATENT DOCUMENTS

| | | | |
|---|---|---|---|
| 11,308,108 B2 | 4/2022 | Ishii et al. | |
| 2020/0184739 A1* | 6/2020 | Nathan | G06Q 10/20 |
| 2022/0271915 A1* | 8/2022 | Turner | H04L 9/3247 |
| 2023/0199236 A1* | 6/2023 | McGill | H04L 9/3239 |
| | | | 725/25 |
| 2024/0184769 A1* | 6/2024 | Nomani | G06F 16/2379 |

FOREIGN PATENT DOCUMENTS

CN    115034409 A    9/2022

OTHER PUBLICATIONS

IPCOM000249447D, "Method and System for Verifying Distributed Processor Vital Product Data (VPD) and Maintenance Procedures via Blockchain Transactions", Feb. 27, 2017, 3 pages.

(Continued)

*Primary Examiner* — Mohammad W Reza
(74) *Attorney, Agent, or Firm* — Andre L. Adkins

(57) ABSTRACT

Embodiments of the present invention provide an approach for dynamically authenticating a performance of a maintenance process via a cognitive and blockchain-based verification technique. Specifically, a person performs a set of maintenance steps as defined by textual summaries stored in a first blockchain. While the person performs the maintenance steps, a video of her performing the steps is recorded. A textual summary for each frame of the video is generated and stored in a second blockchain. A first set of event-entity relationships and the second set of event-entity relationships are extracted from the blockchains and compared to determine a compliance value. Based on the comparison, a determination is made whether the person performed the maintenance process correctly (i.e., as listed in the predefined maintenance steps).

17 Claims, 5 Drawing Sheets

(56) References Cited

OTHER PUBLICATIONS

Abhishek Yadav et al., "Real Time Video to Text Summarization using Neural Network", International Research Journal of Engineering and Technology (IRJET), vol. 7, Issue 12, Dec. 2020, 9 pages.
Ada Mode, "Natural Language Processing for Maintenance Optimisation", Machine Learning, Feb. 12, 2021, 10 pages.
AMA Research & Media LLP, "Text-based Intelligent Virtual Assistant Market to Get a New Boost | Google, Apple, Vodafone Group", Nov. 15, 2022, https://www.openpr.com/news/2806924/text-based-intelligent-virtual-assistant-market-to-get-a-new, 2 pages.
Shridhar et al., "ALFWorld", https://alfworld.github.io/, Nov. 1, 2020, 3 pgs.

\* cited by examiner

AUTHENTICATING A SYSTEM MAINTENANCE VIA A COGNITIVE AND BLOCKCHAIN-BASED PROCESS

TECHNICAL FIELD

The present invention relates to system maintenance, and more specifically to embodiments for dynamically authenticating a performance of a maintenance process via a cognitive and blockchain-based verification technique.

BACKGROUND

Various industrial or commercial systems include a wide range of equipment that operates in high capacities. When a piece of equipment breaks or otherwise malfunctions, not only is it often costly to repair the equipment, but the breakdown could also result in catastrophic effects or chain reactions that affect other components of a system. Reactive maintenance takes place after a problem has occurred, which can be costly to a company to repair. Planned/preventive maintenance occurs before a problem presents itself, which can increase the longevity of equipment and a company's bottom line. Regardless of whether maintenance needing to be performed is preventative or reactive, it is important that an associated maintenance procedure is carried out correctly. The maintenance procedure can include a complete set of instructions on how a maintenance task should be completed, where each execution step is laid out in the correct order and is action oriented.

SUMMARY

Embodiments of the present invention provide an approach for dynamically authenticating a performance of a maintenance process via a cognitive and blockchain-based verification technique. Specifically, a person performs a set of maintenance steps as defined by textual summaries stored in a first blockchain. While the person performs the maintenance steps, a video of her performing the steps is recorded. A textual summary for each frame of the video is generated and stored in a second blockchain. A first set of event-entity relationships and the second set of event-entity relationships are extracted from the blockchains and compared to determine a compliance value. Based on the comparison, a determination is made whether the person performed the maintenance process correctly (i.e., as listed in the predefined maintenance steps).

A first aspect of the present invention provides a method for dynamically authenticating a performance of a maintenance process, comprising: obtaining, by a processor, a set of textual summaries stored in a first blockchain, wherein the textual summaries include predefined instructions on performing the maintenance process; generating, by the processor, a set of textual summaries from a video illustrating a performance of the maintenance process; storing, by the processor, the generated set of textual summaries from the video in a second blockchain; extracting, by the processor, a first set of event-entity relationships from the set of textual summaries stored in the first blockchain and a second set of event-entity relationships from the set of textual summaries stored in the second blockchain; and comparing, by the processor, a first set of event-entity relationships and the second set of event-entity relationships to determine a compliance value.

A second aspect of the present invention provides a computing system for dynamically authenticating a performance of a maintenance process in accordance to the required steps, comprising: a processor; a memory device coupled to the processor; and a computer readable storage device coupled to the processor, wherein the storage device contains program code executable by the processor via the memory device to implement a method, the method comprising: obtaining, by a processor, a set of textual summaries stored in a first blockchain, wherein the textual summaries include predefined instructions on performing the maintenance process; generating, by the processor, a set of textual summaries from a video illustrating a performance of the maintenance process; storing, by the processor, the generated set of textual summaries from the video in a second blockchain; extracting, by the processor, a first set of event-entity relationships from the set of textual summaries stored in the first blockchain and a second set of event-entity relationships from the set of textual summaries stored in the second blockchain; and comparing, by the processor, a first set of event-entity relationships and the second set of event-entity relationships to determine a compliance value.

A third aspect of the present invention provides a computer program product for dynamically authenticating a performance of a maintenance process, the computer program product comprising a computer readable storage device, and program instructions stored on the computer readable storage device, to: obtain, by a processor, a set of textual summaries stored in a first blockchain, wherein the textual summaries include predefined instructions on performing the maintenance process; generate, by the processor, a set of textual summaries from a video illustrating a performance of the maintenance process; store, by the processor, the generated set of textual summaries from the video in a second blockchain; extract, by the processor, a first set of event-entity relationships from the set of textual summaries stored in the first blockchain and a second set of event-entity relationships from the set of textual summaries stored in the second blockchain; and compare, by the processor, a first set of event-entity relationships and the second set of event-entity relationships to determine a compliance value.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
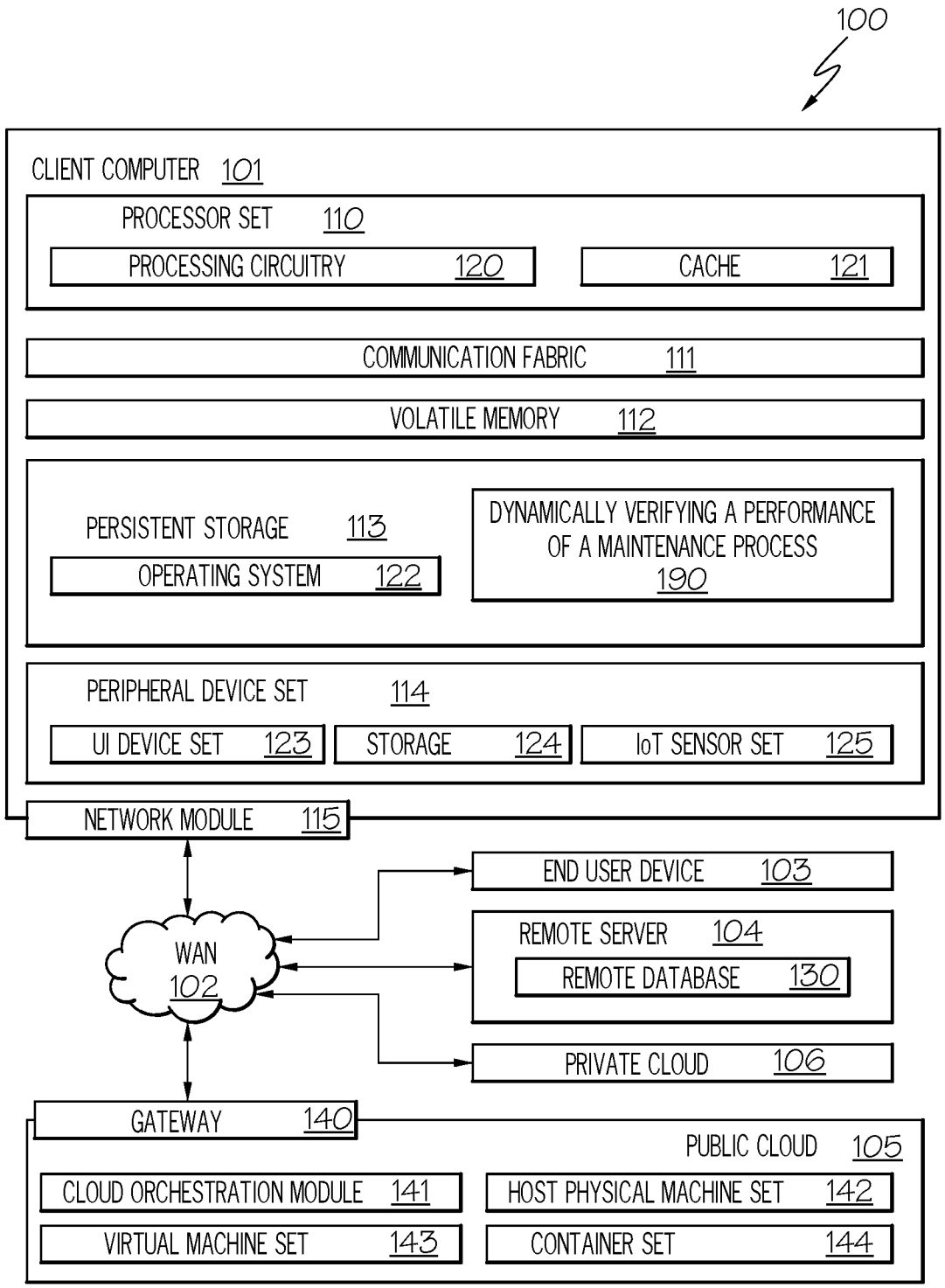
FIG. 1 depicts a block diagram illustrating an example of an environment for the execution of at least some of the computer code involved in performing the inventive methods, in accordance with embodiments of the present invention.

Computing environment 100 of FIG. 1 contains an example of an environment for the execution of at least some of the computer code involved in performing the inventive methods, such as dynamically authenticating a performance of a maintenance process via a cognitive and blockchain-based verification technique 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

System maintenance is a catchall term used to describe various forms of computer or server maintenance required to keep a computer system running properly. It can describe network maintenance, which could mean that servers are being physically repaired, replaced, or moved. Network maintenance can also mean that the software for a server is being updated, changed, or repaired. This sort of maintenance is typically performed on a regular or semi-regular schedule, often during non-peak usage hours, and keeps servers running smoothly.

Information technology (IT) professionals often use system maintenance to describe any sort of repairs being performed on a computer or multiple computers within a network. IT maintenance can often take hours to complete, and professionals usually describe the work in general terms to avoid the timely explanations required for more specific language. When websites are inaccessible due to attacks from hackers, server problems, or for updating and repair, the administrators of the website will often display an image apologizing for the maintenance and website downtime. This allows users to understand that the website cannot be used and that the administrators are aware of the issue.

Preventative maintenance is often performed by IT professionals, usually because a potential problem or security threat has been recognized with a computer or server, and the system administrators are working to deal with the issue before it becomes a true problem. This sort of maintenance is often seen as unnecessary or inconvenient by users who find work interrupted by the sudden need to fix an issue that has not yet affected the user. Preventative maintenance keeps users from encountering far more serious problems and therefore is essential to continued system reliability.

Due to the perceived inconvenience of preventative maintenance, many IT professionals prefer to rely on scheduled maintenance to perform the required system maintenance in a time frame that disrupts other users as little as possible. Scheduled maintenance is ideal for actions like emptying temporary files, running defragmentation programs on hard discs, and clearing out server caches. IT professionals may not always be able to wait until scheduled maintenance to address particularly dire problems with a computer or server. When possible, however, the administrators will often allow minor issues to persist and simply be worked around until the scheduled maintenance can be completed, rather than interrupt the users that rely on the system.

Whenever a maintenance process is performed on any system (e.g., vehicle, electronic device, etc.), which might involve part replacement or maintenance process execution on one or more parts of the system, then there is lack of transparency for the system owner to get verification on whether the part replacement or maintenance process was really performed, and if performed, was it performed correctly. Currently, no solution exists to provide verification that a system maintenance (which might include part replacement) was performed as per requirements or as per a generated invoice for the system maintenance. The present invention provides an automated way for ensuring a smooth verification of a maintenance process's accuracy and veridicality.

As stated, embodiments of the present invention provide an approach for dynamically authenticating a performance of a maintenance process via a cognitive and blockchain-based verification technique. Specifically, a person performs a set of maintenance steps as defined by textual summaries stored in a first blockchain. While the person performs the maintenance steps, a video of her performing the steps is recorded. A textual summary for each frame of the video is generated and stored in a second blockchain. A first set of event-entity relationships and the second set of event-entity relationships are extracted from the blockchains and compared to determine a compliance value. Based on the comparison, a determination is made whether the person performed the maintenance process correctly (i.e., as listed in the predefined maintenance steps).

Figure 2:
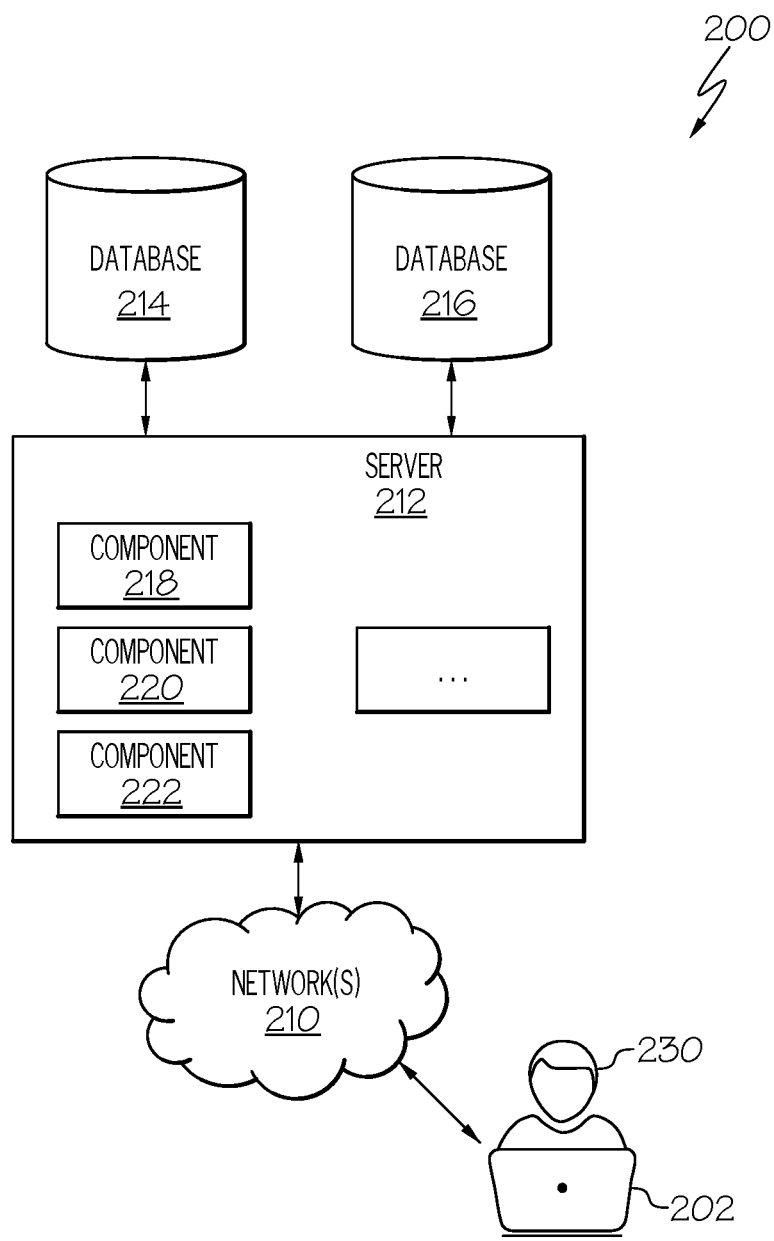
FIG. 2 depicts a block diagram of a distributed system involved in performing the inventive methods, in accordance with embodiments of the present invention.

FIG. 2 depicts a block diagram of a distributed system 200 for implementing one or more of the embodiments. In the illustrated embodiment, distributed system 200 includes one or more client computing devices 202, which are configured to execute and operate a client application such as a web browser, proprietary client, or the like over one or more network(s) 210. Server 212 may be communicatively coupled with remote client computing device 202 of user 230.

In various embodiments, server 212 may be adapted to run one or more services or software applications provided by one or more of the components 218, 220, 222 of the system. In some embodiments, these services may be offered as web-based or cloud services or under a Software as a Service (SaaS) model to a user 230 of one or more client computing devices 202. User 230 operating client computing device 202 may in turn utilize one or more client applications to interact with server 212 to utilize the services provided by these components.

In the configuration depicted in FIG. 2, the software components 218, 220, and 222 of system 200 are shown as being implemented on server 212. User 230 operating the client computing devices 202 may then utilize one or more client applications to use the services provided by these components 218, 220, and 222. These components 218, 220, and 222 may be implemented in hardware, firmware, software, or combinations thereof. It should be appreciated that various different system configurations are possible, which may be different from distributed system 200. The embodiment shown in the figure is thus one example of a distributed system for implementing an embodiment system and is not intended to be limiting. Although exemplary distributed system 200 is shown with one client computing device 202, any number of client computing devices may be supported.

Network(s) 210 in distributed system 200 may be any type of network familiar to those skilled in the art that can support data communications using any of a variety of commercially available protocols, including without limitation TCP/IP (transmission control protocol/Internet protocol), SNA (systems network architecture), IPX (Internet packet exchange), AppleTalk, and the like. For example, network(s) 210 can be a local area network (LAN), such as one based on Ethernet, Token-Ring and/or the like. Network(s) 210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 212 may be adapted to run one or more services or software applications described in the foregoing disclosure. For example, server 212 may correspond to a server for performing processing described above according to an embodiment of the present disclosure.

In some implementations, server 212 may include one or more applications to analyze and consolidate data feeds and/or event updates received from users of client computing device 202. As an example, data feeds and/or event updates may include, but are not limited to, real-time updates received from one or more third party information sources and continuous data streams, which may include real-time events related to sensor data applications, network performance measuring tools (e.g., network monitoring and traffic management applications), clickstream analysis tools, automobile traffic monitoring, and the like. Server 212 may also include one or more applications to display the data feeds and/or real-time events via one or more display devices of client computing device 202.

Distributed system 200 may also include one or more databases 214 and 216. Databases 214 and 216 may reside in a variety of locations. In an example, one or more of databases 214 and 216 may reside on a storage medium local to (and/or resident in) server 212. Alternatively, databases 214 and 216 may be remote from server 212 and in communication with server 212 via a network-based or dedicated connection. In one set of embodiments, databases 214 and 216 may reside in a storage-area network (SAN). Similarly, any necessary files for performing the functions attributed to server 212 may be stored locally on server 212 and/or remotely, as appropriate. In one set of embodiments, databases 214 and 216 may include relational databases that are adapted to store, update, and retrieve data in response to computing language commands.

Figure 3:
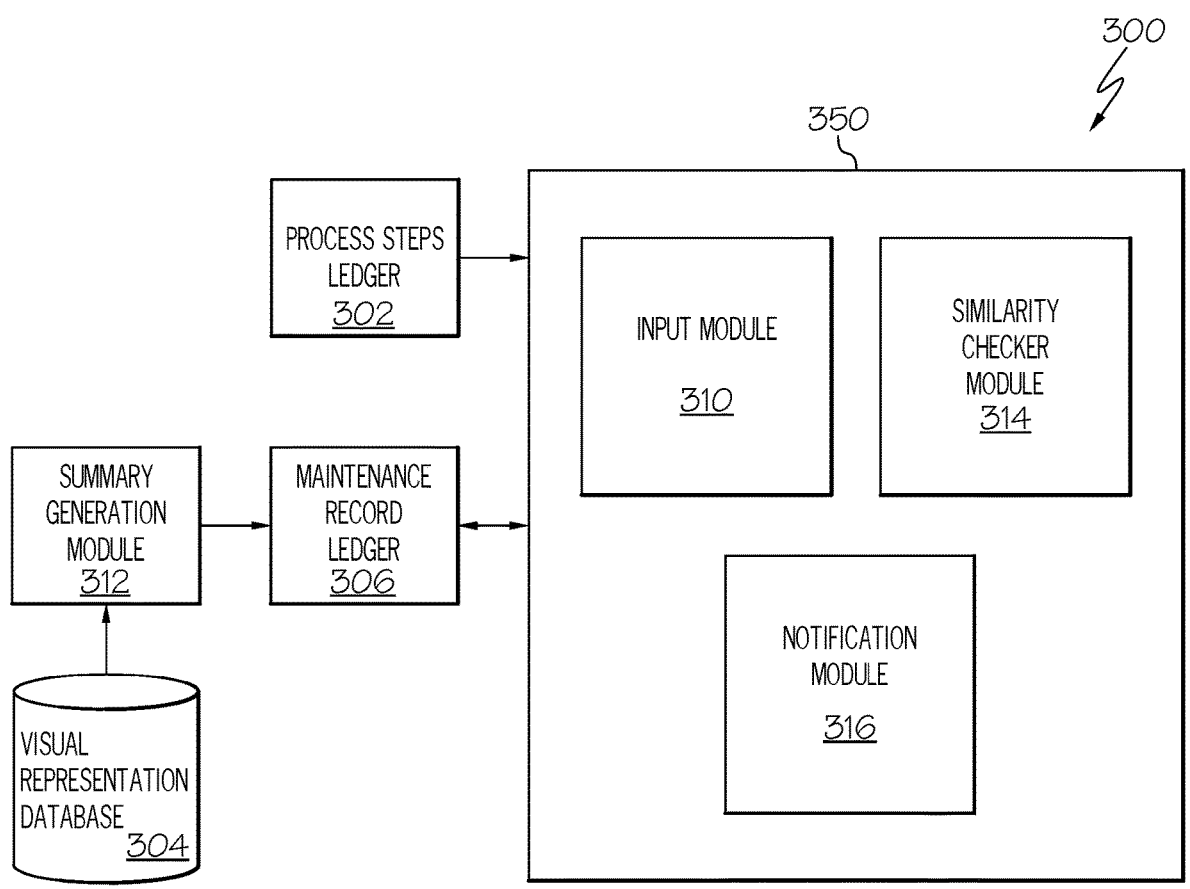
FIG. 3 depicts a block diagram of a system architecture involved in performing the inventive methods, in accordance with embodiments of the present invention.

FIG. 3 depicts a block diagram of one or more components of a system environment 300 by which services provided by one or more components of an embodiment system may be offered as cloud services, in accordance with an embodiment of the present disclosure. In the illustrated embodiment, system environment 300 includes one or more client computing devices 202 (FIG. 2) that may be used by users (e.g., user 230 of FIG. 2) to interact with maintenance process verification (MPV) engine 350 that provides cloud services. It should be appreciated that MPV engine 350 depicted in FIG. 3 may have other components than those depicted. Further, the embodiment shown in the figure is only one example of a cloud infrastructure system that may incorporate an embodiment of the invention. In some other embodiments, MPV engine 350 may have more or fewer components than shown in FIG. 3, may combine two or more components, or may have a different configuration or arrangement of components. MPV engine 350 may comprise one or more computers and/or servers that may include those described above for server 212 of FIG. 2. Similarly, the system may comprise one or more databases (e.g., visual representation database 304) that may include those described above (i.e., database 214 and 216) in FIG. 2.

In accordance with some embodiments, the MPV engine 350 is configured to authenticate a maintenance process performed on any system. As used herein, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

As shown in FIG. 3, MPV engine 350 may include one or more modules, such as summary generation module 312, input module 310, similarity checker module 314, and notification module 316. A maintenance process is a series of steps performed on the system. For a maintenance process, a set of predefined, required, sequential steps including textual instructions for each step are available in a blockchain (i.e., process steps ledger 302). A blockchain is a distributed ledger, similar to a database, but rather than being controlled by a central authority (i.e., a company, individual, etc.) the ledger is dispersed across multiple computers, which can be located all over the world and run by anyone with an Internet connection. At its core, a blockchain is a ledger through which data is added and updated in real-time via consensus of the different software clients (or "nodes") running the software in the network. However, once the data is added to the ledger, it cannot be removed or edited like with a database. Blockchains represent a protocol architecture that removes the need to trust individuals in a permissionless network, fostering social scalability, and a medium of value transfer free from the control or corruption of malicious parties. In a blockchain network, storage and data are redundant, meaning that as long as people run nodes, there is no central point of failure.

Referring back to FIG. 3, the blockchain described above is depicted as process steps ledger 302. In its totality, maintenance steps ledger 302 acts as a comprehensive and detailed document that provides maintenance employees with information on perform maintenance on a system. Process steps ledger 302 includes a set of maintenance instructions or step-by-step, detailed guidelines on how to perform a specific task or activity—the sequence of steps to follow, the tools to use, and how to use the said tools. Each step in the set of maintenance instructions is represented by a single entry in process steps ledger 302.

As shown in FIG. 3, MPV engine 350 includes an input module 310 that is configured to receive maintenance instructions of each step of a maintenance process stored sequentially in process steps ledger 302. As stated, maintenance instructions illustrate how to carry out a predefined maintenance process. Each step in the maintenance process should adequately explain how a worker (e.g., a maintenance engineer) should complete the task described on the step. All the information and approved materials the worker needs to do the task can be listed. Clear, detailed language can be used so that the worker understands what to do with minimum effort. In an embodiment, a standard design format can be used to maintain consistency throughout the blockchain. Each step can represent a single action. In addition, bold, italicized, and uppercase text can be used to emphasize important pieces of information.

Input module 310 is further configured to receive data from maintenance record ledger 306. To that end, a visual representation (e.g., a video, photos) of a maintenance engineer (or other person) performing the maintenance steps on a system that are described in process steps ledger 302 is captured. In other words, the maintenance engineer follows the steps described in process steps ledger 302 when performing the maintenance. Her actions when performing the maintenance steps are video recorded or photographed. The visual representation is stored in visual representation database 304. Visual representation database 304 may include any type of repository adapted to store, update, and retrieve data in response to computing language commands. For purposes of illustration and not limitation, the visual representation may be assumed to be a video recording.

Summary generation module 312 is configured to generate a textual summary (or instruction) for each frame of the maintenance process execution video (mentioned above). In an embodiment, summary generation module 312 can include an artificial intelligence (AI) video description generator that can generate accurate descriptions related to actions performed in a video. Any video description generator, now known or later discovered, capable of generating a textual summary for each frame of a video can be used. Summary generation module 312 then deduplicates the generated textual summaries and stores the deduplicated sequential generated textual summaries of the video frames in maintenance record ledger 306, a blockchain.

Similarity checker module 314 is configured to receive data received by input module 310 including the predefined text instructions of each step of the maintenance process stored sequentially in process steps ledger 302 and the deduplicated sequential generated textual summaries of the video frames in maintenance record ledger 306. Similarity checker module 314 is configured to iterate over the steps of a maintenance process as defined in process steps ledger 302 and the generated textual summaries to compare for similarity (i.e., compliance) between the predefined and performed steps. In an embodiment, similarity checker module 314 extracts event-entity relationships from the process step description stored in process steps ledger 302 and the maintenance process step execution textual summaries generated from the video frames using a natural language processing (NLP) engine, which are stored in maintenance record ledger 306. NLP is the ability of a computer program to understand human language as it is spoken and written, referred to as natural language. It is a component of artificial intelligence.

Event data, also called interaction data or behavioral data, is essential to understand a relationship between a worker and different objects (e.g., tools, replacement parts, etc.), meaning how the worker interacts with the objects when performing steps related to a maintenance process. It's worth noting that while a worker is often the primary entity, tools, parts, and/or the like can also be associated with events. For example, if a car is being maintained, then each part of the car makes up an entity. A maintenance task might include "unscrew the left wiper and set it aside". The event-entity relationship of this maintenance step would be "unscrew_left wiper", where "unscrew" is the event and "left wiper" is the entity. In any case, checker module 314 then searches whether the event-entity relationship from the process step description is in the maintenance textual summaries event-entity relationship list. It stores the result set from the search as evidence of an execution of each required maintenance step stored in process steps ledger 302.

Once the step analysis for each process step as defined in process steps ledger 302 is completed, then similarity checker module 314 compares the similarity between the list of predefined steps as present in process steps ledger 302 and the generated evidence steps (as described above), along with their sequence using existing document similarity mechanisms. Based on the comparison, a compliance value can be generated. If the generated compliance value exceeds a predefined threshold value, then it would authenticate/verify that the maintenance process was performed with surety and correctness. For example, if 90% or more of the steps actually performed matched the predefined steps, it can be assumed that the maintenance process was performed correctly.

Otherwise, similarity checker module 314 determines the maintenance process was not performed accurately as described in process steps ledger 302. Notification module 316 is configured to notify a user 230 (e.g., the maintenance engineer or other person/persons) regarding the correctness of the performed maintenance. In an embodiment, notification module 316 allows user 230 to elect to receive a notification such as, for example, a text message, a cellular phone call, an email, a notification on a display of a user device 202 (e.g., computer, laptop, smart phone, etc.), and/or the like in the event that the performed maintenance was not performed according to the steps defined in process steps ledger 302.

Figure 4:
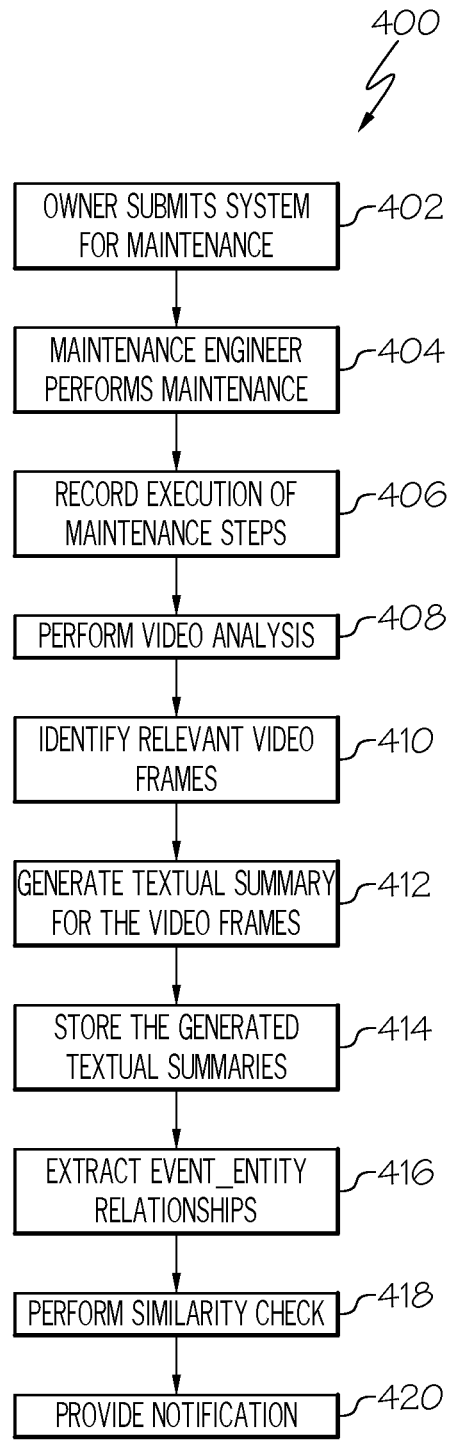
FIG. 4 depicts a flow diagram for dynamically authenticating a system maintenance via a cognitive and blockchain-based verification process, in accordance with embodiments of the present invention.

FIG. 4 depicts a flow diagram 400 for dynamically authenticating a system maintenance via a cognitive and blockchain-based verification process. At 402, an owner (or other authorized party) of a system submits the system for maintenance. At 404, a maintenance engineer (or other authorized person) performs a set of maintenance steps as defined in process steps ledger 302. While the maintenance engineer performs the maintenance steps, a video of her performing the steps is recorded, at 406. At 408, summary generation module 312 analyzes the video of the maintenance step execution. Summary generation module 312 identifies, at 410, the relevant video frames (or in some cases, images) where maintenance steps are being performed. At 412, summary generation module 312 generates a textual summary of the identified frames in which the maintenance steps are shown being executed. The generated textual summary for each step is stored in maintenance record ledger 306 while maintaining the sequence of the steps, at 414.

At 416, similarity checker module 314 extracts event-entity relationships from the process step descriptions stored in process steps ledger 302 and the maintenance process step execution textual summaries generated from the video frames and stored in maintenance record ledger 306 using an NLP engine. It can be noted that the NLP engine can be any or a combination of NLP libraries and/or models that can (a) provide text summaries from videos (e.g., https://alf-world.github.io/) and (b) facilitate using parse trees and part of speech tags to identify and extract entity related events/actions, and (c) can help with text based semantic similarity checks (e.g., sentence transformers, etc.).

At 418, the predefined and generated textual summaries of the maintenance steps stored in the ledgers (i.e., process steps ledger 302 and maintenance record ledger 306, respectively) are compared for similarity, by similarity checker module 314. To that end, similarity checker module 314 ensures that each of the predefined steps needing to be performed were actually performed by comparing the steps in the predefined textual summaries against the generated textual summaries. At 420, a notification is generated based on the results of the comparison and provided to any number of preconfigured users.

Figure 5:
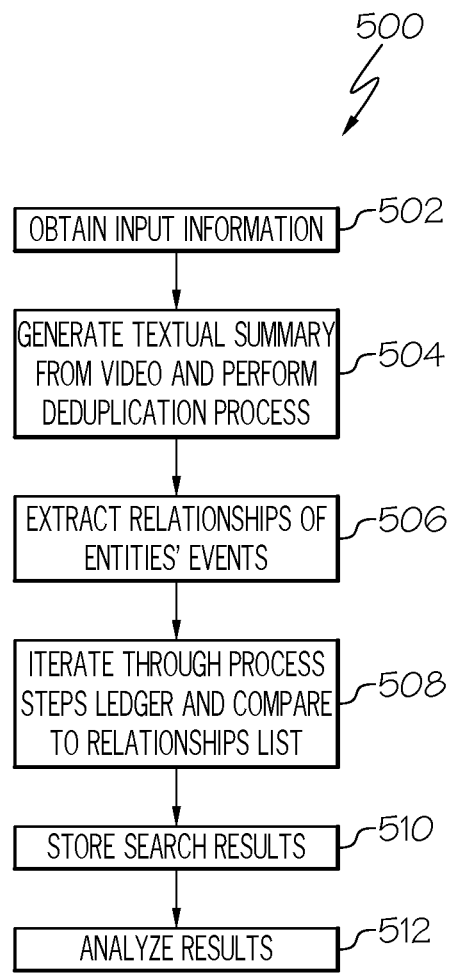
FIG. 5 depicts a flow diagram related to evidence gathering related to a performed maintenance, in accordance with an embodiment of the present invention.

FIG. 5 depicts a flow diagram 500 related to an evidence-gathering flow of a performed maintenance from similarity checker module 314. At 502, input module 310 obtains input information including a list of steps and their description for a maintenance process from process steps ledger 302. Input module 310 further receives a previously recorded visual representation (e.g., a video, photos) of a maintenance engineer (or other person) performing the maintenance steps that are described in process steps ledger 302 on a system. Summary generation module 312 generates a textual summary (or instruction) for each frame of the maintenance process execution video and deduplicates the generated textual summaries, at 504. Deduplication is a technique for eliminating duplicate copies of repeating data.

At 506, similarity checker module 314 extracts event-entity relationships from the process step description stored in process steps ledger 302 and the maintenance process step execution textual summaries generated from the video frames using an NLP engine. Similarity checker module 314 is configured to iterate over the steps of a maintenance process as defined in process steps ledger 302 and the generated textual summaries to compare for similarity (or compliance) between the predefined and performed steps. To that end, at 508, similarity checker module 314 searches whether the event-entity relationship from the process step description is in the maintenance textual summaries event-entity relationship list.

A result from the search performed for each maintenance step is stored in process steps ledger 302 as evidence of an execution of the respective maintenance step, at 510. At 512, similarity checker module 314 compares for compliance between the list of predefined steps as stored in process steps ledger 302 and the generated evidence steps, along with their sequence. If a comparison between them exceeds a predefined threshold, then it would authenticate that the maintenance process was performed with surety and correctness. Otherwise, similarity checker module 314 determines the maintenance process was not performed accurately as described in process steps ledger 302.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically authenticating a performance of a maintenance process, comprising:
    obtaining, by a processor, a set of textual summaries stored in a first blockchain, wherein the textual summaries include predefined instructions on performing the maintenance process;
    generating, by the processor, a generated set of textual summaries from a video illustrating a performance of the maintenance process wherein each frame of the video is associated with a textual summary;
    storing, by the processor, the generated set of textual summaries from the video in a second blockchain;
    extracting, by the processor, a first set of event-entity relationships from the set of textual summaries stored in the first blockchain and a second set of event-entity relationships from the generated set of textual summaries stored in the second blockchain;
    wherein the event is a behavior and the entity is an object associated with the performance;
    comparing, by the processor, the first set of event-entity relationships and the second set of event-entity relationships to determine a compliance value; and
    generating, by the processor, a notification based on the compliance value exceeding a predefined threshold indicating the maintenance process is performed with surety and correctness.

2. The method of claim 1, further comprising removing, by the processor, any duplicates within the set of textual summaries from the video prior to storing the textual summaries in the second blockchain.

3. The method of claim 1, wherein the entity is a replacement part of a system being maintained and the event is an action performed on the entity.

4. The method of claim 1, wherein the event-entity relationships are extracted using a natural language processing technique.

5. The method of claim 1, further comprising iterating, by the processor, through each event-entity relationship in the second set to determine if each event-entity relationship in the second set exists in the first set.

6. The method of claim 5, further comprising generating, by the processor, the notification when at least one event-entity relationship in the second set does not exist in the first set.

7. A computing system for dynamically authenticating a performance of a maintenance process, comprising:
    a processor;
    a memory device coupled to the processor; and
    a computer readable storage device coupled to the processor, wherein the storage device contains program code executable by the processor via the memory device to implement a method, the method comprising:
        obtaining, by a processor, a set of textual summaries stored in a first blockchain, wherein the textual summaries include predefined instructions on performing the maintenance process;

generating, by the processor, a generated set of textual summaries from a video illustrating a performance of the maintenance process wherein each frame of the video is associated with a textual summary;

storing, by the processor, the generated set of textual summaries from the video in a second blockchain;

extracting, by the processor, a first set of event-entity relationships from the set of textual summaries stored in the first blockchain and a second set of event-entity relationships from the generated set of textual summaries stored in the second blockchain;

wherein the event is a behavior and the entity is an object associated with the performance;

comparing, by the processor, the first set of event-entity relationships and the second set of event-entity relationships to determine a compliance value; and generating, by the processor, a notification based on the compliance value exceeding a predefined threshold indicating the maintenance process is performed with surety and correctness.

8. The computing system of claim 7, further comprising removing, by the processor, any duplicates within the set of textual summaries from the video prior to storing the textual summaries in the second blockchain.

9. The computing system of claim 7, wherein the entity is a replacement part of a system being maintained and the event is an action performed on the entity.

10. The computing system of claim 7, wherein the event-entity relationships are extracted using a natural language processing technique.

11. The computing system of claim 7, further comprising iterating, by the processor, through each event-entity relationship in the second set to determine if each event-entity relationship in the second set exists in the first set.

12. The computing system of claim 11, further comprising generating, by the processor, the notification when at least one event-entity relationship in the second set does not exist in the first set.

13. A computer program product dynamically authenticating a performance of a maintenance process, the computer program product comprising a computer readable storage device, and program instructions stored on the computer readable storage device, to:

obtain, by a processor, a set of textual summaries stored in a first blockchain, wherein the textual summaries include predefined instructions on performing the maintenance process;

generate, by the processor, a set of textual summaries from a video illustrating a performance of the maintenance process wherein each frame of the video is associated with a textual summary;

store, by the processor, the generated set of textual summaries from the video in a second blockchain;

extract, by the processor, a first set of event-entity relationships from the set of textual summaries stored in the first blockchain and a second set of event-entity relationships from the generated set of textual summaries stored in the second blockchain wherein the event is a behavior and the entity is an object associated with the performance;

compare, by the processor, the first set of event-entity relationships and the second set of event-entity relationships to determine a compliance value; and generate, by the processor, a notification based on the compliance value exceeding a predefined threshold indicating the maintenance process is performed with surety and correctness.

14. The computer program product of claim 13, further comprising program instructions stored on the computer readable storage device to remove, by the processor, any duplicates within the set of textual summaries from the video prior to storing the textual summaries in the second blockchain.

15. The computer program product of claim 13, wherein the entity is a replacement part of a system being maintained and the event is an action performed on the entity.

16. The computer program product of claim 13, wherein the event-entity relationships are extracted using a natural language processing technique.

17. The computer program product of claim 13 further comprising program instructions stored on the computer readable storage device to iterate, by the processor, through each event-entity relationship in the second set to determine if each event-entity relationship in the second set exists in the first set and generating the notification when at least one event-entity relationship in the second set does not exist in the first set.

* * * * *